United States Patent
Grigsby et al.

(10) Patent No.: US 7,525,417 B1
(45) Date of Patent: Apr. 28, 2009

(54) METHOD AND SYSTEM FOR TRANSITIVE TURN SIGNAL AND BRAKING INDICATION

(75) Inventors: Travis M. Grigsby, Austin, TX (US); Vandana Mallempati, Austin, TX (US); Steven Michael Miller, Cary, NC (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/122,649

(22) Filed: May 16, 2008

(51) Int. Cl.
B60Q 1/26 (2006.01)

(52) U.S. Cl. .......................... 340/468; 340/475; 701/70

(58) Field of Classification Search ................ 340/475, 340/467, 479, 464, 466, 469, 463, 465, 468; 701/96, 300, 301, 70
See application file for complete search history.

(56) References Cited

U.S. PATENT DOCUMENTS

| | | | |
|---|---|---|---|
| 3,892,483 A * | 7/1975 | Saufferer | 356/3.12 |
| 5,357,438 A * | 10/1994 | Davidian | 701/301 |
| 5,424,726 A * | 6/1995 | Beymer | 340/902 |
| 5,805,103 A * | 9/1998 | Doi et al. | 342/70 |
| 6,121,896 A * | 9/2000 | Rahman | 340/902 |
| 6,278,360 B1 * | 8/2001 | Yanagi | 340/436 |
| 6,356,189 B1 * | 3/2002 | Fujimaki | 340/465 |
| 6,427,111 B1 * | 7/2002 | Dieckmann | 701/96 |
| 7,077,549 B1 * | 7/2006 | Corliss | 362/499 |
| 7,190,260 B2 * | 3/2007 | Rast | 340/479 |
| 2002/0105423 A1 * | 8/2002 | Rast | 340/479 |
| 2004/0207519 A1 | 10/2004 | Tracy | |
| 2006/0220826 A1 * | 10/2006 | Rast | 340/479 |
| 2007/0168129 A1 * | 7/2007 | Thorne | 701/301 |
| 2007/0241874 A1 | 10/2007 | Okpysh | |

FOREIGN PATENT DOCUMENTS

DE 2001017568 2/2001

* cited by examiner

Primary Examiner—Benjamin C. Lee
Assistant Examiner—Travis R Hunnings
(74) Attorney, Agent, or Firm—Shimokaji & Associates, P.C.

(57) ABSTRACT

A method for managing observable information in a front of a vehicle and providing a representation of the information to a rear of the vehicle in the form of a local optical signal is disclosed. The method comprising monitoring, at the vehicle, a remote signal, the remote signal being one selected from the group consisting of: interrupted, changed brightness and steady; determining a status of the monitored remote signal; determining a distance between a vehicle transmitting the remote signal and said vehicle; determining a speed of the vehicle; determining an action responsive to the monitored signal status, the determined distance and the speed, activating a local signal in response to the action, the action causing at least one of an interruption of the local signal at a first known rate and a changed brightness; initiating the local optical signal in response to a local action at the vehicle, wherein the initiation causing at least one of an interruption of the local signal at a second known rate and a changed brightness of the local optical signal, the activation of the local optical signal supplementing any initiation of the local optical signal, wherein a condition of interruption of the local optical signal at the second known rate inhibits the supplemental activation of the local optical signal.

1 Claim, 4 Drawing Sheets

METHOD AND SYSTEM FOR TRANSITIVE TURN SIGNAL AND BRAKING INDICATION

BACKGROUND OF THE INVENTION

The present invention relates generally to motor vehicles and more particularly to a method of providing information regarding a leading vehicle to subsequent trailing vehicles among a plurality of vehicles in a line.

With the ever increasing size of motor vehicles in the form of sports utility vehicles, vans, etc., a situation often occurs when trailing such a large vehicle in that the trailing vehicle lacks a view of the road in front to the large vehicle. In many cases, the lack of knowing what is occurring in front of the larger, leading, vehicle has an impact on the trailing vehicle and in turn each of the vehicles in the line of cars following the lead vehicle. For example, the leading vehicle may engage the brake to slow down gradually or to stop suddenly. In other cases, the leading vehicle may signal a turn, by engaging the turn signal lever and causing the turn signal indicator(s) to begin flashing. In addition, the leading vehicle may engage both the brake and the turn signal substantially simultaneously causing both a change in brightness of the rear signal lights along with a flashing of the same or different rear signal lights. In each of these cases, the driver in a trailing vehicle is required to engage his/her own brake in response to the actions of the leading vehicle In addition, each of the subsequently trailing vehicles, in turn, responds with a braking action based on the actions of the vehicle that they are following.

However, a driver in a vehicle trailing a leading vehicle does not know whether the braking action of the leading vehicle is merely to reduce speed slightly, or to reduce speed at a much greater rate. Similarly, when a turn signal is engaged, the driver in the trailing vehicle does not know when the leading vehicle will begin slowing down to make the turn. In either case, the driver in the trailing vehicle must respond as if in a worst case scenario and begin a braking action that may be slightly faster and harder than that of the leading vehicle.

Hence, there is a need for a method and device for providing information regarding information of a leading vehicle to drivers in a line of vehicles trailing the leading vehicle.

SUMMARY OF THE INVENTION

A method for managing observable information in a front of a vehicle and providing a representation of the information to a rear of the vehicle in the form of a local optical signal comprises monitoring, at the vehicle, a remote signal, the remote signal being one selected from the group consisting of: interrupted, changed brightness and steady; determining a status of the monitored remote signal; determining a distance between a vehicle transmitting said remote signal and said vehicle; determining a speed of the vehicle; determining an action responsive to the monitored signal status, the determined distance and the speed, activating a local signal in response to the action, the action causing at least one of an interruption of the local signal at a first known rate and a changed brightness; initiating the local optical signal in response to a local action at the vehicle, wherein the initiation causing at least one of an interruption of the local signal at a second known rate and a changed brightness of the local optical signal, the activation of the local optical signal supplementing any initiation of the local optical signal, wherein a condition of interruption of the local optical signal at the second known rate inhibits the supplemental activation of the local optical signal.

These and other features, aspects and advantages of this invention of the present invention will become better understood with reference to the following drawings, description, and claims.

DETAILED DESCRIPTION

Figure 1:
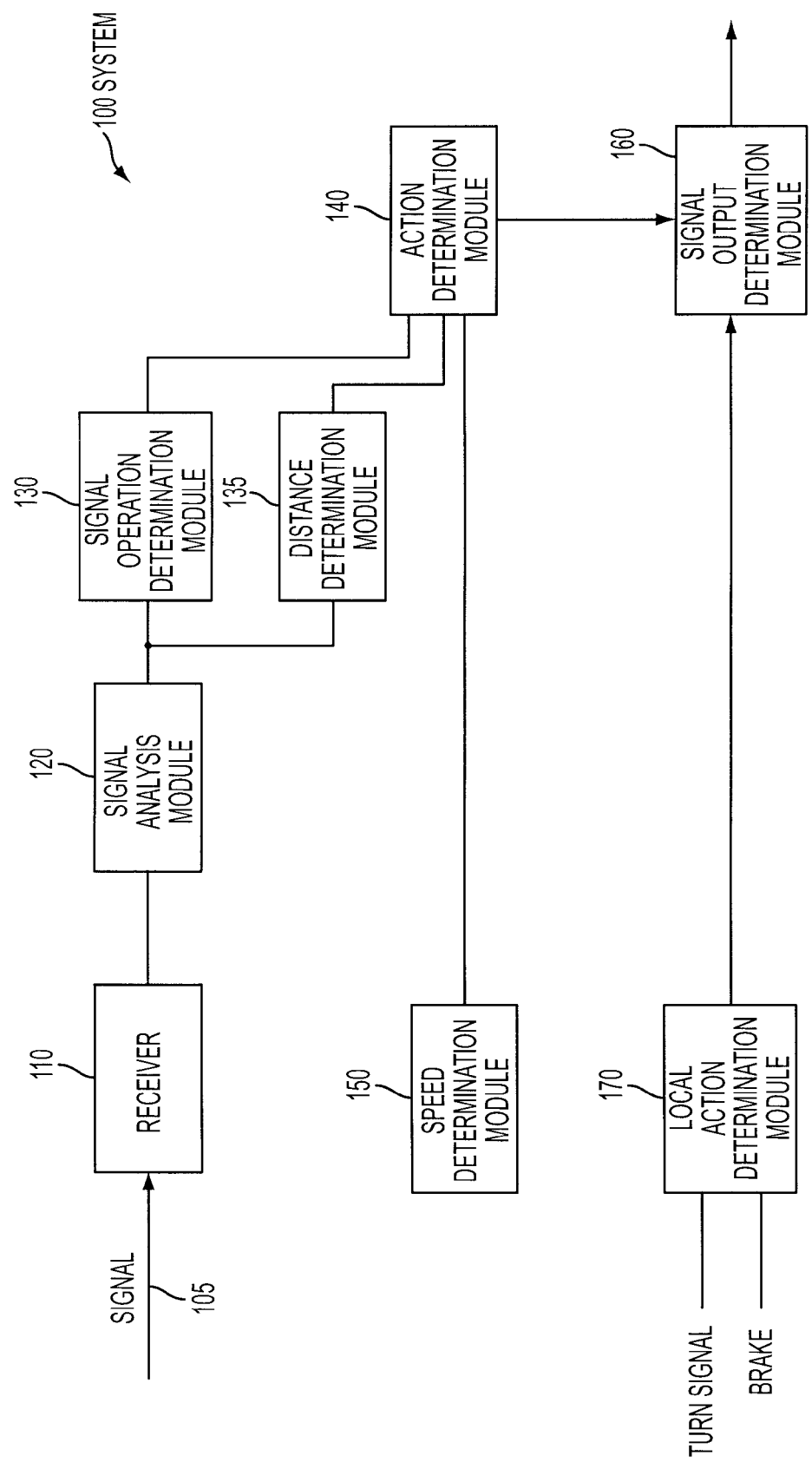
FIG. 1 illustrates a block diagram of an exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features describe below.

Broadly, embodiments of the present invention provide a method and apparatus for transmitting information regarding operations of a vehicle preceding an immediately preceding vehicle to a trailing vehicle. For example, the view of a first vehicle by the trailing vehicle may be blocked by an intermediate vehicle and, hence, information regarding actions of the first vehicle is now provided to the trailing vehicle.

It would be recognized by those skilled in the art, that the invention described herein can take the form of an entirely hardware embodiment, an entirely software embodiment, or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The invention is suitable for storing and/or executing program code and can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 illustrates a block diagram of an exemplary system embodiment 100 of the invention, incorporated into a vehicle, which is further referred to as a trailing or local vehicle. In this exemplary embodiment, a signal receiving module 110 can receive a signal 105 from a vehicle in front of the local vehicle (leading vehicle). The signal may be an optical signal such as one generated by the rear or tail lights of the leading vehicle. The received signal 105 may be provided to a signal analysis module 120 that analyzes the provided signal. The analyzed signal can next be provided to a signal operation module 130 and a distance determination module 135. The signal operation module 130 may determine the particular operation of the rear signal lights of the leading vehicle. The status of the rear signal lights may be in the form of an off condition, a steady condition (lights on), a blinking condition (turn indicator) and/or an increased brightness condition (braking). The distance determination module 135 may determine a relative distance between the leading (remote) and trailing (local) vehicles. The operation or status of the rear signal lights of the remote vehicle and the determined distance can be provided to an action determination module 140. In addition, a speed of the local vehicle can be obtained, from the speedometer, at block 150, and can be provided to the action determination module 140.

Based on a condition or status of the rear signal lights of the leading (remote) vehicle, the distance between the remote and local vehicle, and the speed to the local vehicle, an action may be determined. For example, if the rear signal lights of the remote vehicle are operating as a turn signal, and the distance and speed are within known values, then the action determination module 140 may indicate that the turn signal of the local vehicle may also operate in a modified turn signal mode. In this case, the rate of operation of the turn signal of the local vehicle may be different than that of the rate when the local vehicle initiates a similar turn signal. This provides the driver in the local vehicle with the information that the leading vehicle is turning. In another aspect, if the rear signal lights of the remote vehicle are operating as a brake signal, then the action determination module 140 may cause the signal lights of the local vehicle to change in brightness to provide information regarding the condition of the leading (remote) vehicle to a vehicle following the local vehicle.

As noted, the action determination module 140 may further consider the distance between the remote vehicle and the local vehicle and the speed of the local vehicle to determine an action. For example, if the distance exceeds a known limit, then no action need be taken as the actions of the remote vehicle have no effect on the local vehicle. In addition, the known distance limit may be determined as a function of the speed of the local vehicle, e.g., greater speed may increase the distance limit.

In one aspect of the invention, the optical receiver 110 may be a camera that provides a view of the road ahead. The camera may be a still camera taking pictures at a known rate or a video camera. The receiver may be an optical receiver that receives the red light of the rear signal lights. The receiver 110 may further be an automobile mesh network exchange unit that receives digital information regarding the vehicles via a wireless network. The receiver may include information via satellite or may receive the return of Radar signals (radio frequency) that are transmitted by the local vehicle (not shown) or by the leading vehicle. The satellite information may also include GPS information, which may also be used to determine a distance between the vehicles. The receiver may also receive ultrasonic signals. Although the embodiment of the invention has been described with regard to optical signals, it would be recognized by those in the art that the signals may be of any electromagnetic type signal and that the use of the term "optical" herein is to be taken to mean any type of electromagnetic signal that may be transmitted in free-space or may be transmitted in a digital form.

Figure 2:
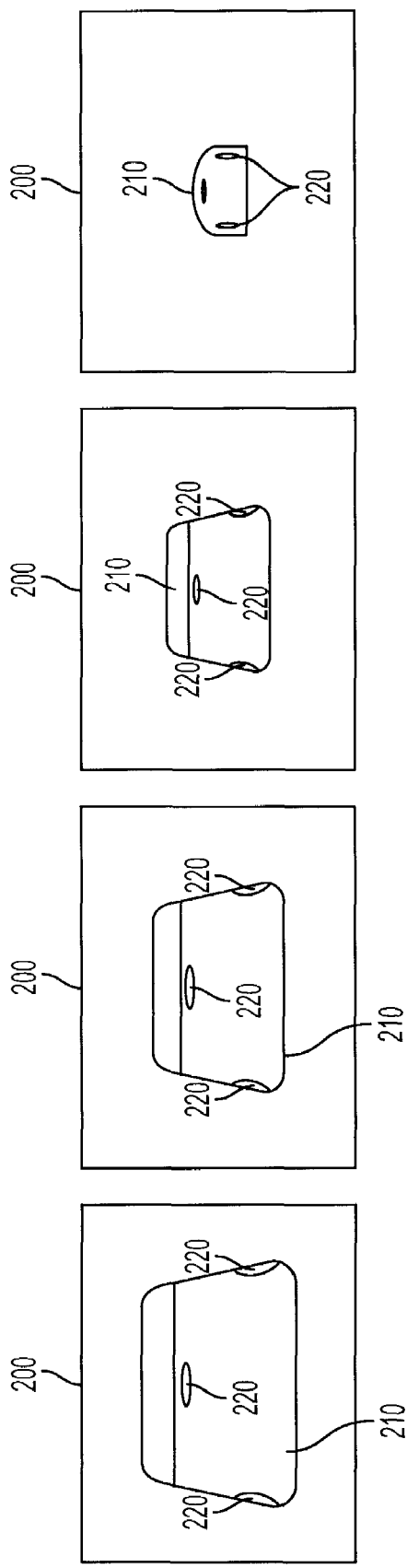
FIGS. 2A-2D illustrate exemplary views of images for determining a relative distance.

FIGS. 2A-2D illustrate an exemplary method of determining a distance between a remote (immediately preceding) vehicle and a local vehicle. In this exemplary case, a camera may be used to collect images of the road ahead of the local vehicle. FIG. 2A illustrates an example of an image collected a receiver 110. Rear lights 220 are typically positioned left, right and in the center of the vehicle 210 and need not be discussed in detail herein. In another aspect of the invention, special lights (not shown) may be incorporated into the rear of a vehicle. These special lights may be used to determine a condition of the remote vehicle. Camera (receiver 110) may provide an image of the rear signal lights or special lights, if used, to signal analysis module 120 as previously described. As the rear lights are standardized as being of a red color, the signal analysis module may be "tuned" to changes in the rate of change or the brightness of the red color from one image to another.

The distance determination module 140 may analyze a captured image to determine the percentage of space occupied by the remote vehicle in the image. This may be determined, for example, by determining the distance between the left/right rear signal lights and the percentage this distance is with respect to the overall width of the image frame. Using this criterion, for example, FIG. 2A may be characterized as a very close distance, FIG. 2B may be characterized as a close distance, FIG. 2C may be characterized as a far distance and FIG. 2D may be characterized as a very far distance. In another aspect, the percentage of a single color i.e., a vehicle color, may be evaluated with respect to the colors within the overall image to determine an estimate of the distance or a characterization of the distance. In still other aspects, an estimate of the distance, or an actual distance, may be determined based on received radio frequency, ultrasonic frequencies, received GPS signals, and/or in-vehicle data exchange.

Figure 3:
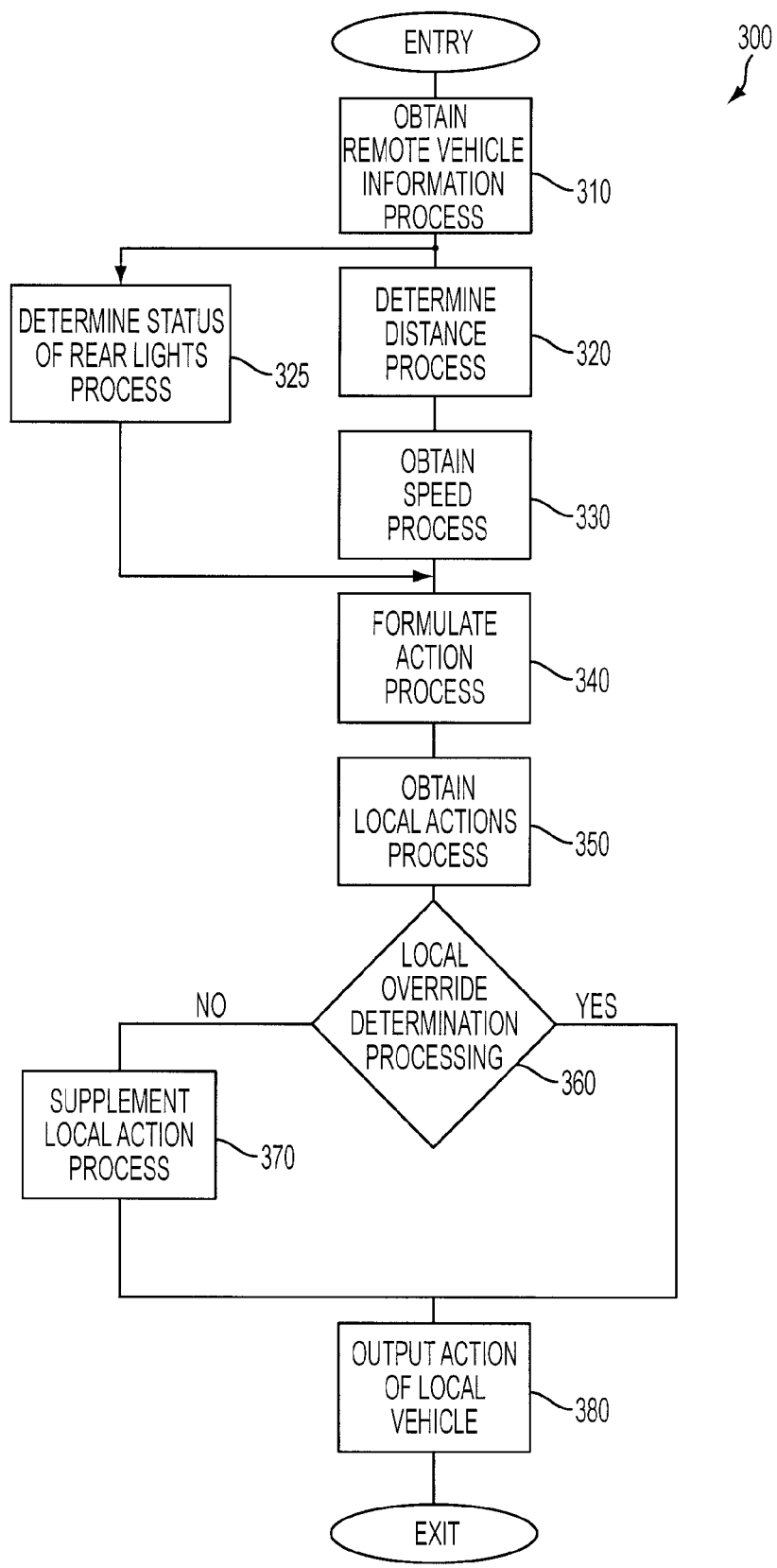
FIG. 3 illustrates a flow chart of an exemplary method of providing information to a trailing vehicle in accordance with the principles of the invention.

FIG. 3 is a flow chart of an exemplary method 300 of providing information to a trailing vehicle in accordance with the principles of the invention. In this exemplary method, an image may be obtained at step 310. As previously described this image may be any type of signal that is associated with the remote vehicle. At step 320, a determination may be made regarding the distance between the remote vehicle and the local vehicle and at step 330 a speed of the local vehicle may be obtained. At step 325, a determination may also be made regarding the status of the rear signal lights of the remote vehicle. As previously described, this may be determined by an optical receiver, from a plurality of consecutive images, a data exchange performed digitally, or via wireless communications. At step 340, an action that affects the rear signal lights of the local vehicle can be formulated based on a status of the rear signal lights of the remote vehicle, a distance measurement and a local vehicle speed. At step 350, actions taken at the local vehicle that may affect the rear signal light status of the local vehicle can be obtained by sensors, for example, that monitor a turn signal condition or a brake pedal depression. At step 360 a determination can be made whether one or more local actions override the determined action. For example, if the local turn signal is blinking at a first rate, then there is no need to provide turn signal information determined from the remote vehicle to a vehicle following the local vehicle.

Otherwise, the determined action can supplement the local action if it is determined that the local action(s) does not override the determined action. For example, if the local action is to brake, the determined action may supplement the change in brightness due to braking with a flashing at a rate not comparable to a normal turning indication rate, to provide information to the driver in a trailing vehicle that the braking is being caused by the turn signal indication of the leading vehicle. At step 380, the combination of the local and the determined action can be then outputted.

Figure 4:
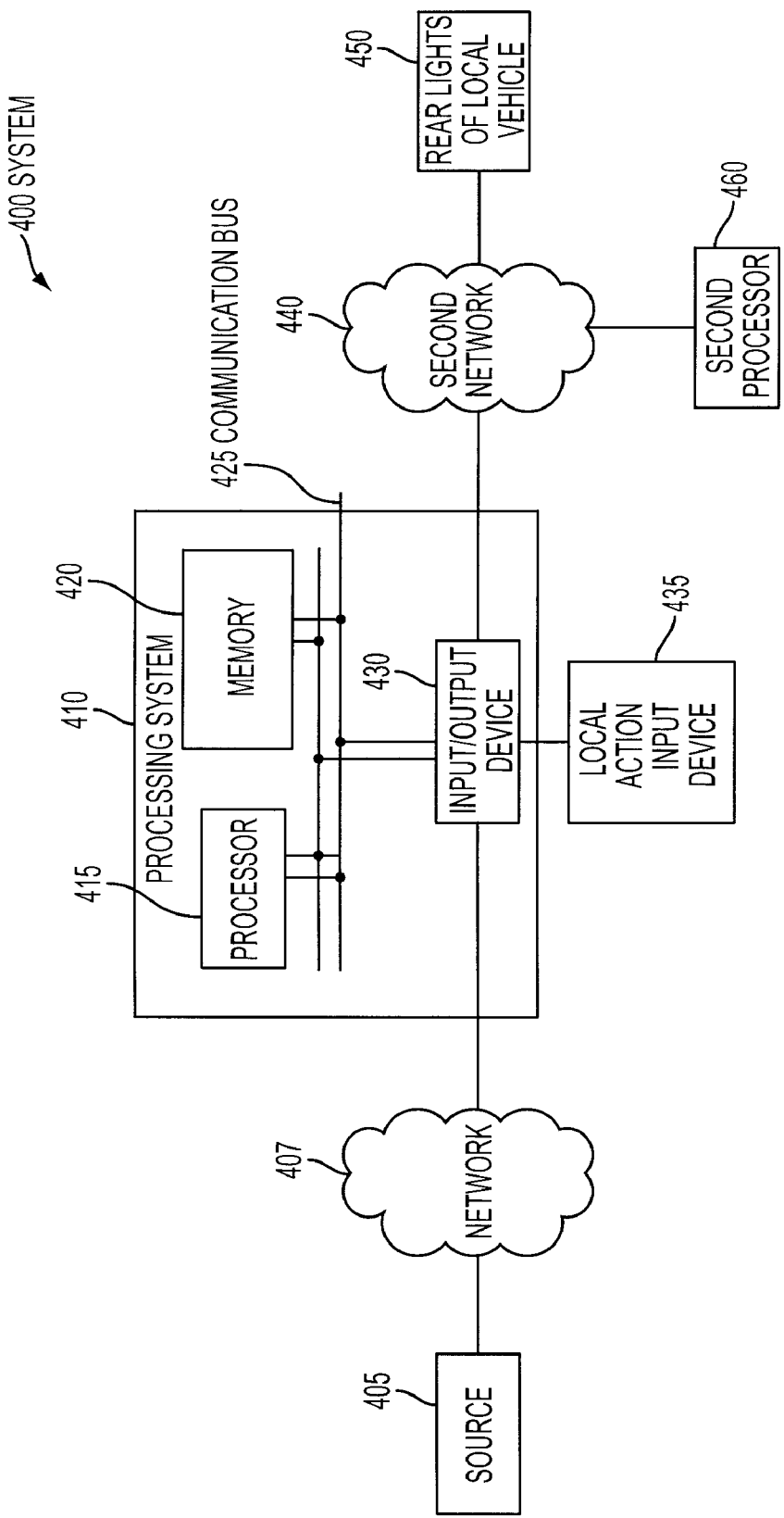
FIG. 4 illustrates an exemplary system for implementing the method shown in FIG. 3.

FIG. 4 illustrates an exemplary system 400 for implementing the method shown in FIG. 3. In this exemplary system, information regarding the status of the remote vehicle rear signal lights, distance, etc. may be provided by source(s) 405 via network 407 to a processing system 410. Network 407 may be a wired or wireless network. Processing system 410 can include a processor 415, a memory 420 and an input/output device 430 that are in communication via a communication bus 425. I/O device 430 may also receive information regarding conditions of the local vehicle 435. Memory 420 may include code or software instructions which when accessed by processor 415 may instruct processor 415 to execute the steps shown in FIG. 3. I/O device 430 may then communicate the result of the processing performed by processor 415 to rear signal lights of the local vehicle via network 440. Network 407 and 440 may be the same or different networks of the same or different types. The information may also be provided to second processor 460 for subsequent analysis and processing.

As can be appreciated by those skilled in the art, the present invention provides an improved device and method for providing information to drivers in vehicles in a line of vehicles, when the drivers may not have visible access to vehicles other than the one vehicle immediately preceding the driver's vehicle.

It should be understood, of course, that the foregoing relates to exemplary embodiments of the invention and that modifications may be made without departing from the spirit and scope of the invention as set forth in the following claims.

What is claimed is:

1. A method for managing observable information in a front of a vehicle and providing a representation of said information to a rear of said vehicle in the form of a local optical signal, said method comprising:

monitoring, at said vehicle, a remote signal, said remote signal being one selected from the group consisting of: interrupted, changed brightness and steady;

determining a status of said monitored remote signal;

determining a distance between a vehicle transmitting said remote signal and said vehicle, said distance being selected from the group consisting of: an estimated distance value and an actual distance value;

determining a speed of said vehicle;

determining an action responsive to said monitored signal status, said determined distance and said speed, activating a local optical signal in response to said determined action, said determined action causing at least one of an interruption of said local optical signal at a first known rate and a changed brightness;

initiating said local optical signal in response to a local action at said vehicle, wherein said initiation causes at least one of an interruption of said local optical signal at a second known rate and a changed brightness of said local optical signal, supplementing any initiation of said local optical signal with said activation of a local optical signal in response to said determined action; and inhibiting said supplementing of said local optical signal when at least one of: interruption of said local optical signal at said second known rate occurs and said determined distance is greater than a known distance criterion.

* * * * *